United States Patent
Zucchelli

(10) Patent No.: US 9,745,445 B2
(45) Date of Patent: Aug. 29, 2017

(54) FLAME RETARDANT POLYMERIC COMPOSITION

(71) Applicant: ITALMATCH CHEMICALS S.p.A., San Benigno (IT)

(72) Inventor: Ugo Zucchelli, San Benigno (IT)

(73) Assignee: ITALMATCH CHEMICALS S.p.A., San Benigno (Genoa) (IT)

(*) Notice: Subject to any disclaimer, the term of this patent is extended or adjusted under 35 U.S.C. 154(b) by 0 days.

(21) Appl. No.: 14/766,760

(22) PCT Filed: Feb. 8, 2013

(86) PCT No.: PCT/EP2013/000376
§ 371 (c)(1),
(2) Date: Aug. 10, 2015

(87) PCT Pub. No.: WO2014/121804
PCT Pub. Date: Aug. 14, 2014

(65) Prior Publication Data
US 2015/0376368 A1    Dec. 31, 2015

(51) Int. Cl.
| | | |
|---|---|---|
| *C08K 3/32* | (2006.01) | |
| *C08L 23/08* | (2006.01) | |
| *C08K 5/5419* | (2006.01) | |
| *C08L 31/04* | (2006.01) | |
| *C08L 83/06* | (2006.01) | |
| *C08K 3/00* | (2006.01) | |
| *C08K 5/00* | (2006.01) | |
| *C08K 3/22* | (2006.01) | |

(52) U.S. Cl.
CPC .................. *C08K 3/32* (2013.01); *C08K 3/22* (2013.01); *C08K 5/5419* (2013.01); *C08L 23/0815* (2013.01); *C08L 23/0853* (2013.01); *C08L 31/04* (2013.01); *C08L 83/06* (2013.01); *C08K 3/0058* (2013.01); *C08K 5/0066* (2013.01); *C08K 2003/2224* (2013.01); *C08K 2003/2227* (2013.01)

(58) Field of Classification Search
CPC .................................. C08K 3/22; C08K 3/32
See application file for complete search history.

(56) References Cited

U.S. PATENT DOCUMENTS

| | | | |
|---|---|---|---|
| 2010/0160523 A1* | 6/2010 | Zucchelli ............... | C09K 21/04 524/414 |
| 2012/0238664 A1* | 9/2012 | Yan ........................ | C08L 75/04 523/179 |
| 2014/0303294 A1 | 10/2014 | Zucchelli | |

FOREIGN PATENT DOCUMENTS

| | | |
|---|---|---|
| WO | 2009/010812 | 1/2009 |
| WO | 2011/069301 | 6/2011 |
| WO | 2012/168746 | 12/2012 |

OTHER PUBLICATIONS

Int'l Search Report for PCT/EP2013/000376, three pages (Oct. 2013).
Written Opinion for PCT/EP2013/000376, three pages (Oct. 2013).
Int'l Preliminary Report on Patentability for PCT/EP2013/000376, four pages (Apr. 2015).

* cited by examiner

*Primary Examiner* — Lanee Reuther

(57) ABSTRACT

The invention disclose halogen free thermoplastic or cross linked polymers compositions comprising a polyolefin and/or a polyolefin containing polar co-monomers and a combination of metal hydroxides and inorganic hypophosphite as a synergic, and optionally other ingredients. These compositions show a superior balance of flame retardant properties compared to already known corresponding halogen free formulations. Molded items obtained using the polymer composition according to the present invention are useful in a wide range of injection molding and extrusion applications, especially cables.

20 Claims, No Drawings

FLAME RETARDANT POLYMERIC COMPOSITION

This application is the U.S. national phase of International Application No. PCT/EP2013/000376, filed 8 Feb. 2013, which designated the U.S.; the entire content of which is hereby incorporated by reference.

SUBJECT OF THE INVENTION

The invention disclose halogen free thermoplastic or cross linked polymers compositions comprising a polyolefin and/or a polyolefin containing polar co-monomers and a combination of metal hydroxides and inorganic hypophosphite as a synergic, and optionally other ingredients. These compositions show a superior balance of flame retardant properties compared to already known corresponding halogen free formulations. Molded items obtained using the polymer composition according to the present invention are useful in a wide range of injection molding and extrusion applications, especially cables.

BACKGROUND OF THE INVENTION

Organic halogen compounds are widely used to impart flame retardancy to organic polymers.

Organic halogen however do generate highly corrosive halogen based compounds and other gases during combustion, develop a dark smoke under a fire scenario, and are becoming a topic of environmental concern, so that halogen free flame retardants are gaining more and more attraction.

Metal hydroxides, in particular Aluminum hydroxide and Magnesium hydroxide, are non toxic and non corrosive flame retardant fillers for polymers, they generate low smoke when burned and for these reasons they represent the ideal choice for environmentally friendly compounds, or for critical application like zero halogen cables. Their flame proofing effect is based on the endothermic decomposition and further interaction of the oxide residue within the polymer, leaving a "protective char".

Main application for metal hydroxides is in wire and cable, basic polymers used are low density polyethylene (LLDPE), Ethyl vinyl acetate (EVA), and Polyolefins. Experience show that a filling level of around 55% by weight in EVA copolymer containing 18% Vinyl Acetate is generally necessary to fullfill the basic flame retardancy requirements in some applications. However, very often in order to meet stringent standards, far higher values are required, for example up to 65% of filler.

One drawback in the use of metal hydroxides is clearly the high filling level which is required, that often results in reduced mechanical properties as well as reduced extrusion efficiency due to increate processing viscosities. Therefore, a lot of work has been spent into the improvement of either the efficiency of metal hydroxides as flame retardants and on the processability and mechanical properties of such compounds by adjusting the metal hydroxide properties (surface treatments, improved morphology) as well as by adjusting the formulation (use of polymer-filler coupling agents and processing aids additives).

One approach, in order to improve flame retardant performances and physical properties of metal hydroxide filled polymers is to include co-additives (also called synergies) into the polymer formulation.

The use of the so called "char forming" additives in polyolefins and rubber as a synergic to metal hydroxides has been previously described.

For instance, the use of zinc borate, which is able to improve overall flame retardant properties is well know, as reported for instance in "Recent avances in the use of zinc borate in flame retardancy of Eva" (Polymer degradation and Stability 64 (1999) 419-425).

Also metal molybdates have some efficiency in promoting char forming, as reported for instance in "Enhanced FR performance enabled by magnesium hydroxide with metal molybdate in EVA" (Wire and Cable compound Proceedings of the 58th International Wire and Cable Symposium, pag. 569-576).

Poly Di Methyl Siloxane (PDMS), also called silicones or silicon oils or silicone gums or rubbers, as such or in masterbatches form are regularly used to improves processing of hydrate filled compounds and improve surface appearance. On the top of their processing aid function, PDMS are also know to act as flame retardant synergic, as reported for instance in U.S. Pat. No. 4,731,406, EP0466193, EP0402904.

More recently, organic metal phosphinate used with alpha-olefins/vinyl acetate having a defined vinyl acetate content and metal hydroxides are showed to increase flame retardant performance, see for example WO 2011/076760 assigned to Lanxess. According to WO 2011/076760, a combination of Metal hydroxides and organic metal phosphinate is limited to polymers composed by alpha-olefins/vinyl acetate with vinyl acetate content range from 40% to 90% by weight. Alpha-olefins containing vinyl acetate lower than 40% by weight are more difficult to make flame resistant, even though they are commonly used in cables compounds because of their benefits in processing and mechanical properties. There is therefore the need of improving flame retardancy of metal hydroxide containing compositions even in a broader range of vinyl acetate content.

Flame Retardancy Evaluation

Flame retardant properties may be well evaluated through cone calorimeter measurements.

The cone calorimeter (ASTM E1354/ISO 5660) has long been a useful tool for fire safety engineers and researchers interested in quantitative material flammability analysis. It remains one of the most usefull bench-scale tests that attempts to simulate real-world fire conditions.

The cone calorimeter brings quantitative analysis by investigating parameters as:
  HRR=Heat Release Rate (kW/m2)
  TTI=Time To Ignition(s)
  THR=Total Heat Release (kW/m2)

For example, the peak HRR is an important parameter, that can be used to measure the intensity of fire. Sometimes one or more selected measurements provide useful information in regulatory fire scenarios, and the most relevant specific example are FIGRA or FPI:
  FIGRA=fire growth rate (kW/m2s)=peak HRR/time to peak HRR
  FPI=fire performance index (m2s/kW)=TTI/peak HRR The higher the value of the FPI or the lower the value of FIGRA, the higher would be the product safety rank. Despite there is not widespread agreement in the industry about which parameter is most meaningful, cone calorimeter on cable specimens has been successfully correlated with real-scale burning tests.

OBJECT OF THE INVENTION

Object of the present invention is a polymer composition, particularly a polyolefin composition, not containing halogen, comprising an inorganic hypophosphite as a synergic with respect to well known metal hydroxide flame retardant agents and fillers. Surprisingly, small amounts of hypophosphite improves flame retardant performances without increasing the total amount of the flame retardant agent and of its synergic. Without being bound to any theory, it is thought that, upon burning, the metal hypophosphite decomposition products react with the metal hydroxide creating a strong char in the solid residue that is less permeable to oxygen and thus is able to stop the flame propagation.

Surprisingly, metal hypophosphite and hydroxide combinations according to the present invention have been demonstrated higher in performances with respect to organic metal phosphinate even used as flame retardant agents in alpha-olefins with a vinyl acetate content lower than 40% by weight.

DETAILED DESCRIPTION OF THE INVENTION

The present invention relates to a polymer composition containing a flame retardant combination of an inorganic hypophosphite, a metal hydroxide, a polymer or polymer blends and optionally other additives as coupling agents, processing aids, fillers, crosslinking agents/co-agents, stabilizers and pigments.

Inorganic Hypophosphites

Hypophosphorus acid metal salts, also called inorganic phosphinates or inorganic hypophosphites (phosphorus valence state=+1) are known as effective halogen free flame retardant additives for polymers.

Hypophosphites have the following chemical formula:

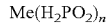
$$Me(H_2PO_2)_n$$

where: "n" is an integer number ranging from 1 to 4 in dependence of the valence of the metal Me. The metal is any atom belonging to the groups I, II, III and IV of the periodic table of the elements.

Hypophosphite of sodium and calcium are widely commercially available and they are normally produced by reacting the corresponding metal hydroxide on yellow phosphorus, as for instance:

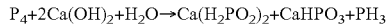
$$P_4+2Ca(OH)_2+H_2O \rightarrow Ca(H_2PO_2)_2+CaHPO_3+PH_3$$

Hypophosphite of metals other than calcium and sodium are normally produced through the hypophosphorus acid reaction on the metal hydroxide or by exchange reaction with the corresponding soluble metal salts (see for example "Hypophosphorus Acid and its salts", *Russian Chemical Review*, 44 (12), 1975).

The choice of hypophosphites is subjected to a number of critical factors. Particularly, suitable hypophosphites must be characterized by sufficient thermal stability to overcome melt processing at temperature higher than about 200° C. In case they do form hydrates they must be used in the corresponding anhydrous form and they must not be hygroscopic when successively exposed to ambient humidity. Examples of such hypophosphites are aluminum hypophosphite (CAS 7784-22-7), calcium hypophosphite (CAS 7789-79-9), manganese hypophosphite (10043-84-2), magnesium hypophosphite (CAS 10377-57-8), zinc hypophosphite (CAS 15060-64-7), barium hypophosphite (CAS 171258-64-3). Most preferred in the purpose of the present invention are aluminum and calcium hypophosphites.

Aluminum hypophosphite, corresponding to chemical formula $Al(H_2PO_2)_3$, is currently produced by Italmatch Chemicals Spa ("Phoslite IP-A") in a white powder form with a low humidity level, high purity and various PSD suitable for thermoplastic processing.

Calcium hypophosphite, corresponding to chemical formula $Ca(H_2PO_2)_2$, is also currently produced by Italmatch Chemicals Spa ("Phoslite IP-C").

Aluminum and calcium hypophosphite, being flammable powders as most of anhydrous hypophosphites, are often commercialized as dry powders blended with other solid flame retardants agents, in masterbatch or in paste form, for making transport and manipulation operations easier.

Thermoplastic polymers moulding materials containing hypophosphites as flame retardants have been described in the art.

Polycarbonate containing hypophosphites as flame retardants have been described in WO 2005/044906. Polycarbonate is not in the purpose of the present invention.

Polyamides containing hypophosphites as flame retardants have been described in WO 2005/075566. Polyamides are not in the purpose of the present invention.

According to WO 2007/010318 polyolefin polymers, particularly polypropylene compositions, are made flame retardant by incorporating a synergic mixture of inorganic hypophosphite and halogenated organic compounds. Halogen compounds however do generate highly corrosive halogen based and other gases during combustion, and are becoming a topic of environmental concern, so olefin polymers compositions containing halogen are not in the object of the present invention.

According to WO 2009/010812, a polymer compositions, particularly polyesters or polyamides, comprising hypophosphites coated with inorganic hydrates and/or organic salts, show good flame retardant performance but, at the same time, showed reduced polymer degradation compared to a corresponding polymer composition comprising uncoated hypophosphites. The claimed ratio hypophosphite to metal hydrate coating, is in the range 100/1 to 5/1 by weight. Such coated hypophosphites, when applied to polyolefins, polar polyolefins and crosslinked rubbers do not show satisfactory results in term of flame retardancy compared to existing formulations based on metal hydroxides. Increasing dramatically the metal hydroxide content in the system, so decreasing the ratio hypophosphite to metal hydroxide in the range from 5/1 to 1/3 by weight, flame retardancy became even worse.

Surprisingly, according to the present invention, it has been discovered that when the amount of metal hypophosphite in the system is below the ratio: metal hypophosphite to metal hydroxide 1/3 by weight, flame retardancy is improved compared to existing metal hydroxide based formulations.

Hypophosphites in the composition range according to the present invention are new flame retardant agents when used as synergic to metal hydroxides specifically on polyolefins and polar polyolefins.

Metal Hydroxide

Metal hydroxide, that can be also called metal hydrates, are flame retardant agents based on metal hydroxides salts or metal hydroxide molecules, able to release water upon heating, i.e. in the range from about 200° up to about 400° C. Examples are aluminum hydroxide and magnesium hydroxide, of both synthetic or natural origin and with different particle size and surface treatments. Other compounds are boehmite (aluminum oxide-hydroxide) or also layered double hydroxides, which may be referred as hydrotalcite. Mix of the different hydroxides with other fillers (not hydrate) like calcium carbonate or calcinated kaolin or natural occurring mineral silicates or magnesium carbonate or huntite or hydromagnesite are also in the scope of the present invention. Particularly, calcium carbonate is often employed to reduce cost and improve processing and mechanical properties of the compound.

Polymer and Polymer Blends

In the composition of the invention the polymer is at least a polyolefin, at least a polar polyolefin or a mixture of at least a polyolefin with at least a polar polyolefin. The term polyolefin is used for both olefin homo- or co-polymers. Example of polyolefins include homopolymers or copolymers of ethylene, propylene, butene, esene, isoprene, ottene. Possible polyolefins include: PP (Poly Propylene), LDPE (Low Density Poly Ethylene), LLDPE (Linear Low Density Poly Ethylene), VLDPE (Very Low Density Poly Ethylene), MDPE (Medium Density Poly Ethylene), HDPE (High Density Poly Ethylene), EPR (Ethylene Propylene Rubber), EPDM (Ethylene Propylene Diene Monomer) and Plastomers or Poly Olefin Elastomers like ethyelene 1-ottene or ethylene 1-esene produced with single site catalyst technology.

The term polar polyolefins is used for copolymers of olefin with polar co-monomers, like vinyl acetate, alkyl acrylates, methacrylates, acryklic acids, methacrylic acid, acrylonitrile and styrene. Examples of polar polyolefins include EVA (Ethylene Vinyl Acetate), EVM (Ethylene Vinyl Monomer rubbers, the segment of EVA copolymers with vinyl acetate content between 40% and 90%), EBA (Ethylene Butyl Acrylate), EEA (Ethylene Ethyle Acrylate), EMA (Ethylene Methyl Acrylate), NBR (Nitrile Butadiene Rubber), SBR (Styrene Butadiene Rubber).

It is particularly preferred, according to the present invention, that the polar polyolefin comprises a copolymer of ethylene with vinyl acetate with a vinyl acetate content from 4% to 80%, more preferably from 14% to 50%.

Polar polyolefins, depending on their polar monomer content, confer good flame retardant properties, and may be used in combinations with polyolefins, conferring to the resulting polymer composition additional interesting properties such as good processability, better thermal resistance and electrical properties.

Coupling Agents

A polymeric coupling agent is a polymer that link an inorganic filler, for example Aluminum or Magnesium hydrate, to the polymer matrix. In any case the addition of high level of filler will reduce the elongation at break, and the toughness of the polymer. In order to overcome the drawbacks of the addition of fillers, coupling agents have to be added in order to reduce the repellency of the polymers and fillers respectively. As a result, the filler will adhere better to the polymer matrix and the properties of the final composite (mainly toughness and dispersion) will be enhanced. Because better filler dispersion may improve flame retardancy by avoid dripping and improving char consistency, coupling agents may also be considered as flame retardant coadjuvants. Maleated polymers are a well known family of functionalized polymers used as coupling agents. They can be prepared directly by polymerization or by modification during compounding (this process is called reactive extrusion). Silanes or aminosilanes are also used to improve adhesion between the filler and the polymer matrix. One example is vinyltrimethoxysilane.

Processing Aids

In the industrial field, the term "silicones" usually refer to linear or branched polydimehtylsiloxanes (PDMS) fluids and gums, used as a processing aid to improve extrusion, surface aspect, abrasion resistance, friction. They are also often used as flame retardant adjuvant. Silicones oil or gums are generally available in masterbatches form or supported on inert fillers with high surface area, like silica.

Vinyl unsatured PDMS are also possible to be used in conjuction with radical initiators for in situ grafting into the polymer.

According to the present invention, a particularly useful polymeric composition comprises aluminum or magnesium hydroxide, calcium carbonate, Aluminum hypophosphite, coupling agents and polydimethylsiloxane. This composition showed significant improvements when used in extrusion processes for cable insulation.

The composition according to the invention is advantageously used in cable jacketing for low, medium or high voltage as well as for primary electrical insulation.

Again, polymeric composition of the invention, is used for cable conduit extruded profile, roofing foil, molded pallet, tarpaulin, floor covering, wall covering.

According to the present invention, polymer compositions, particularly polyolefin compositions, characterized by the presence of metal hydroxide or metal hypophosphite only as flame retardant agent, FIGRA values (in the first case i.e. metal hydroxide as sole flame retardant agent) and FPI values (in the second case i.e. metal hypophosphite as sole flame retardant agent) are not good enough to be considered as slightly satisfactory. When metal hydroxide concentrations raise with respect to the amount of metal hypophosphite, FIGRA and FPI values are not good as well. On the contrary, in case the ratio metal hydroxide/metal hypophosphite in the polymeric composition is 95/5 to 97/3 according to the present invention, surprisingly FIGRA and FPI values are optimal, particularly if compared with those deriving from the compositions according to the prior art.

Particularly, it has been found that, according to the present invention, the following percentage range values of metal hypophosphite on the total weight % of the mixture metal hypophosphite+metal hydroxide are preferred:

1% to 33%
1% to 20%
1,5% to 9%
3% to 5%.

Experimental Part

The lab-scale compounds were prepared in a 100 cc Brabender mixer at 180° C. with 60 rpm for 5 minutes. Compounds samples were pressed into 3 mm thick plaques at 180° C. for 5 minutes for subsequent cone calorimeter analysis. Each reported cone calorimeter measurement, is the mean of 5 single measurements performed at 35 kW/m2 irradiation in a Stanton Redcroft's machine. This kind of measurement calculates, through suitable software, the following parameters:

TTI=Time To Ignition (kW/m2)
HRR=Heat Release Rate (kW/m2)
HRR peak=maximum of peak of HRR (kW/m2)
THR=Total Heat Relase (MJ/m2)
EHC=Effective Heat Release (MJ(kg)

FIGRA and FPI were calculated manually. When the HRR vs time curve shows a second peak, and this second peak is higher in intensity than the first peak, it means a restart of burning. This occurrence is not desired, and it is therefore reported in the following tables as "Curve observation" arrow, as "NOT OK".

Materials used for preparing the tested compositions:

Polymers

Greenflex MQ 40 (Enichem, Ethylene vinyl acetate having a VA content=19%), hereafter "EVA"

Exact 8201 (Dex Plastomers; ethylene 1-octene plastomer with hardenss Shore A=85 e MFR (190° C., 2,16 kg)=1 gr/10'), hereafter "Plastomer"
Metal Hydrates
Magnifin H10 (Magnesium hydroxide by Albemarle), hereafter "Mg(OH)$_2$,"
Alcan Superfine (Aluminum hydroxide by Alcan), hereafter "Al(OH)$_3$,"
FR Additives
Firebrake ZB (Zinc borate by Borax), hereafter "ZnB"
Metal Hypophosphite
Phoslite IP-A (, Aluminium hypophosphite by Italmatch Chemicals), hereafter "IP-A"
Organic Phosphinate
Exolit OP1230 (Aluminium diethylphosphinate, by Clariant), hereafter "OP1230"
Coupling Agent
Compoline CO LL/05 (Auserpolimeri, LLDPE grafted with around 0.5-1% of maleic anhydride), hereafter "LLDPE-g-MAH"
Processing Aids
Silmaprocess AL1142A (Silma Srl, silicon oil masterbatch 50% concentrated, based on LLDPE), hereafter "PDMS MB"

EXAMPLES

In Examples 2 and 3 (indicated in the following Table 1 as E.2 and E.3) and Comparative Example 1,4,5,6,7,8,9 (indicated in the following Table 1 as C.1, C.4-C.9) (Table 1), cone calorimeter results are reported as well as the corresponding FIGRA and FPI for EVA based formulations at 65% total loading of filler by weight were calculated. Comparing C. 1 and C. 9, we can observe that FPI values of compositions containing Aluminum hypophosphite (C.9) are worse than those of the compositions containing an equal amount of Aluminum hydroxide (C.1). Comparing FIGRA and FPI values of C.7 and C.8 (realized according to WO 2009/010812) with corresponding values reported for C. 9, we can observe an improvement in flame retardancy properties, notwithstanding this improvement is not sufficient to be compared to C. 1 value. Increasing the ratio of Aluminum hydroxide to Aluminum hypophosphite (C.6, C.5, C.4) flame retardant properties decrease dramatically in terms of FIGRA and FPI values. Surprisingly, E. 2 and E. 3 show a great improvement over C. 1 in terms of FIGRA and FPI values.

In Example 10 and Comparative Example 11 (Table 2) cone calorimeter results for plastomer based formulations at 55% loading of Magnesium hydroxide are reported. The calculated FIGRA and FIP values show the beneficial effect of the presence of Aluminum hypophosphite into the composition according to the present invention (according to Example 10).

TABLE 2

|  | Example 10 | Comparative 11 |
|---|---|---|
| Plastomer | 39% | 39% |
| LLDPE-g-MAH | 4% | 4% |
| PDMS MB | 2% | 2% |
| IP-A | 2% |  |
| Mg(OH)2 | 53% | 55% |
| TTI (sec) | 116 | 122 |
| HRR medium (kW/m2) | 73 | 78 |
| HRR peak (kW/m2) | 181 | 204 |
| Time to HRR peak (sec) | 175 | 170 |
| THR (MJ/m2) | 65 | 68 |
| EHC (MJ/kg) | 27 | 29 |
| FIGRA (lower, the best) | 1.03 | 1.20 |
| FPI (higher, the best) | 0.64 | 0.60 |
| Curve observation | OK | OK |

In Table 3, Comparative Example 12 (C.12) to Comparative Example 21 (C.21), cone calorimeter results for EVA based formulation at 65% loadings of Magnesium hydroxide are reported.

Calculated FIGRA and FPI values for polymer compositions according to Example 13, when compared to the results obtained through the polymer compositions according to Comparative Example 12 (C.12), show the beneficial effect of Aluminum hypophosphite into the polymer composition according to the invention.

Similar performances are achievable with zinc borate instead of Aluminium hypophosphite, but only if zinco borate is loaded at 5% (C.14). When Zinc Borate is loaded at the corresponding concentration of Aluminium hypophosphite, i.e. 2%, a re start of flame is observed (C.15). Example 18 compared to Comparative Example 16 and Example 13 show that a coupling agent in presence of Aluminum hypophosphite, further improves FR performances. Comparative Example 17 compared to Example 18 shows that the presence of aluminum hypophosphite together with the metal hydroxide can give superior performances with respect to analogous compositions comprising organic metal phosphi-

TABLE 1

|  | C. 1 | E. 2 | E. 3 | C. 4 | C. 5 | C. 6 | C. 7 | C. 8 | C. 9 |
|---|---|---|---|---|---|---|---|---|---|
| EVA | 35% | 35% | 35% | 35% | 35% | 35% | 35% | 35% | 35% |
| Al(OH)3 | 65% | 63% | 61% | 52.5% | 32.5% | 12.5% | 4% | 2% |  |
| IP-A |  | 2% | 4% | 12.5% | 32.5% | 52.5% | 61% | 63% | 65% |
| TTI (sec) | 96 | 86 | 77 | 48 | 54 | 51 | 55 | 50 | 52 |
| HRR peak (kW/m2) | 235 | 145 | 115 | 276 | 284 | 258 | 140 | 137 | 150 |
| Time to HRR peak (sec) | 169 | 145 | 108 | 123 | 130 | 128 | 137 | 133 | 137 |
| FIGRA (lower, the best) | 1.40 | 1.00 | 1.06 | 2.24 | 2.18 | 2.01 | 1.02 | 1.03 | 1.09 |
| FPI (higher, the best) | 0.41 | 0.59 | 0.67 | 0.44 | 0.46 | 0.50 | 0.39 | 0.36 | 0.35 |

From the above data it is evident that, while FIGRA value of the compound according to C.9, comprising Aluminum hypophosphite as the sole Flame Retardant agent, is comparable with corresponding values of compounds according to E.2 and E.3 according to the present invention, FPI values of the compounds according to the invention, significantly improve.

nate. Example 20 compared to Comparative Example 19 shows how the presence of a coupling agent and polydimethylsiloxane further improves FR performances in the presence of Aluminum hypophosphite together with the metal hydroxide, while its substitution with Zinc Borate in the same composition, does not afford similar performances (C. 21).

TABLE 3

| | C. 12 | E. 13 | C. 14 | C. 15 | C. 16 | C. 17 | E. 18 | C. 19 | E. 20 | C. 21 |
|---|---|---|---|---|---|---|---|---|---|---|
| EVA | 35% | 35% | 35% | 35% | 31% | 31% | 31% | 29% | 29% | 29% |
| LLDPE-g-MAH | | | | | 4% | 4% | 4% | 4% | 4% | 4% |
| PDMS MB | | | | | | | | 2% | 2% | 2% |
| OP 1230 | | | | | | 2% | | | | |
| IP-A | | 2.00% | | | | | 2% | | 2% | |
| Mg(OH)2 | 65% | 63% | 60% | 63% | 65% | 63% | 63% | 65% | 63% | 60% |
| ZnB | | | 5.0% | 2% | | | | | | 5% |
| TTI (sec) | 96 | 102 | 96 | 111 | 134 | 138 | 113 | 130 | 116 | 126 |
| HRR medium (kW/m2) | 91 | 67 | 65 | 77 | 88 | 90 | 72 | 71 | 56 | 73 |
| HRR peak (kW/m2) | 235 | 134 | 131 | (108) | 199 | (184) | 139 | (150) | 105 | 139 |
| Time to HRR peak (sec) | 169 | 126 | 125 | (122) | 175 | (203) | 159 | (218) | 177 | 209 |
| THR (MJ/m2) | 56 | 65 | 64 | 50 | 53 | 61 | 63 | 48 | 53 | 47 |
| EHC (MJ/kg) | 24.6 | 27 | 28 | 22 | 22 | 25 | 26 | 21 | 23 | 22 |
| FIGRA (lower, the best) | 1.39 | 1.06 | 1.05 | — | 1.14 | 0.91 | 0.87 | — | 0.59 | 0.66 |
| FPI (higher, the best) | 0.40 | 0.76 | 0.73 | — | 0.67 | 0.75 | 0.81 | — | 1.1 | 0.91 |
| Curve observation | OK | OK | OK | NOT OK | OK | NOT OK | OK | NOT OK | OK | OK |

In Table 4, cone calorimeter results for EVA based formulation at 65% loadings of Aluminum hydroxide are reported.

Calculated FIGRA and FIP for Example 25 and Example 26 compared to corresponding results obtained according to Comparative Examples 22, 23 and 24 show the beneficial effect of Aluminum hypophosphite when used in combination with metal hydroxides.

TABLE 4

| | C. 22 | C. 23 | C. 24 | E. 25 | E. 26 |
|---|---|---|---|---|---|
| EVA | 35% | 35% | 35% | 35% | 35% |
| Al(OH)3 | 65% | 60% | 63% | 63% | 61% |
| IP-A | | | | 2% | 4% |
| ZnB | | 5% | 2% | | |
| TTI (sec) | 96 | 96 | 101 | 86 | 77 |
| HRR medium (kW/m2) | 91 | 77 | 73 | 76 | 60 |
| HRR peak (kW/m2) | 235 | 177 | (122) | 145 | 115 |
| Time to HRR peak (sec) | 169 | 142 | (163) | 145 | 108 |
| THR (MJ/m2) | 56 | 62 | 60 | 66 | 48 |
| EHC (MJ/kg) | 24.6 | 25 | 25 | 26 | 26 |
| FIGRA (lower, the best) | 1.40 | 1.25 | — | 1.00 | 1.06 |
| FPI (higher, the best) | 0.41 | 0.54 | — | 0.59 | 0.67 |
| Curve observation | OK | OK | NOT OK | OK | OK |

In Table 5, Comparative Examples 27, 28, 30 and Example 29, cone calorimeter results for EVA based formulation at 55% loadings of Aluminum hydroxide are reported.

Calculated FIGRA and FIP values for polymeric compositions according to Comparative Examples 27 and 30 are compared to corresponding values obtained for polymeric compositions according to the present invention (Example 29). It is shown the beneficial effect of Aluminum hypophosphite when used in combination with metal hydroxides, according to the present invention.

Comparative Example 28 is compared to Example 29. The comparison shows that aluminum hypophosphite used as flame retardant together with metal hydroxide gives superior performances to the polymeric compositions with respect to organic metal phosphinate used in corresponding formulations.

TABLE 5

| | C. 27 | C. 28 | E. 29 | C. 30 |
|---|---|---|---|---|
| EVA | 41% | 41% | 41% | 41% |
| LLDPE-g-MAH | 4% | 4% | 4% | 4% |
| IP-A | | | 2% | |
| Al(OH)3 | 55% | 53% | 53% | 53% |
| OP 1230 | | 2% | | |
| ZnB | | | | 2% |
| TTI (sec) | 92 | 114 | 95 | 101 |
| HRR medium (kW/m2) | 102 | 116 | 91 | 91 |
| HRR peak (kW/m2) | 192 | (238) | 179 | 201 |
| Time to HRR peak (sec) | 156 | (175) | 154 | 168 |
| THR (MJ/m2) | 64 | 66 | 62 | 62 |
| EHC (MJ/kg) | 25 | 28 | 24 | 24 |
| FIGRA (lower, the best) | 1.23 | 1.36 | 1.16 | 1.20 |
| FPI (higher, the best) | 0.48 | 0.48 | 0.53 | 0.50 |
| Curve observation | OK/NOT OK * | NOT OK | OK | OK/NOT OK * |

* 3 curves out of 5 show a second peak higher than the first one

In Table 6, Comparative Examples 31, 32, 34 and Example 33 according to the present invention, cone calorimeter results for EVA based formulation at 55% loadings of Magnesium hydroxide are reported.

Calculated FIGRA and FIP values for compositions obtained according to Comparative Examples 31 and 32 are compared to corresponding values of polymeric compositions according to the present invention (Example 34). It is shown the beneficial effect of Aluminum hypophosphite used as FR agent in combination with metal hydroxide.

Comparative Example 32 compared to Example 33 according to the invention shows that aluminum hypophosphite used as flame retardant agent in polymer formulations according to the present invention, is superior to organic metal phosphinate used in corresponding formulations.

TABLE 6

|  | C. 31 | C. 32 | E. 33 | C. 34 |
| --- | --- | --- | --- | --- |
| EVA | 41% | 41% | 41% | 41% |
| LLDPE-g-MAH | 4% | 4% | 4% | 4% |
| IP-A |  |  | 2% |  |
| Mg(OH)2 | 55% | 53% | 53% | 53% |
| OP 1230 |  | 2% |  |  |
| ZnB |  |  |  | 2% |
| TTI (sec) | 127 | 121 | 110 | 129 |
| HRR medium (kW/m2) | 122 | 125 | 112 | 135 |
| HRR peak (kW/m2) | 314 | (277) | 256 | (345) |
| Time to HRR peak (sec) | 231 | (193) | 192 | (251) |
| THR (MJ/m2) | 65 | 66 | 64 | 64 |
| EHC (MJ/kg) | 27 | 27 | 25 | 26 |
| FIGRA (lower, the best) | 1.36 | 1.44 | 1.33 | 138 |
| FPI (higher, the best) | 0.40 | 0.44 | 0.43 | 0.37 |
| Curve observation | OK | NOT OK | OK | NOT OK |

The invention claimed is:

1. A thermoplastic or cross-linked polymer composition, comprising a thermoplastic or cross-linked polymer, wherein said thermoplastic or cross-linked polymer is selected from the group consisting of polyolefins, polar polyolefins, and their mixtures and said thermoplastic or cross-linked polymer composition includes a combination of at least a metal hypophosphite and a metal hydroxide, the combination having a ratio of the metal hypophosphite to the metal hydroxide within a range of 1:100 to 1:3 by weight.

2. The thermoplastic or cross-linked polymer composition according to claim 1, wherein said ratio is within a range of 1:70 to 1:5 by weight.

3. The thermoplastic or cross-linked polymer composition according to claim 1, wherein said ratio is within a range of 1:64 to 5:64 by weight.

4. The thermoplastic or cross-linked polymer composition according to claim 1, wherein the thermoplastic or cross-linked polymer composition further comprises additional ingredients and additives.

5. The thermoplastic or cross-linked polymer composition according to claim 4, wherein the thermoplastic or cross-linked polymer composition comprises a polymeric coupling agent.

6. The thermoplastic or cross-linked polymer composition according to claim 4, wherein the thermoplastic or cross-linked polymer composition comprises a copolymer with acrylic acid.

7. The thermoplastic or cross-linked polymer composition according to claim 4, wherein the thermoplastic or cross-linked polymer composition comprises a polymer grafted with maleic anhydride.

8. The thermoplastic or cross-linked polymer composition according to claim 4, wherein the thermoplastic or cross-linked polymer composition comprises a polydimethylsiloxane, silicone oil, or silicone gum.

9. The thermoplastic or cross-linked polymer composition according to claim 4, wherein the metal hypophosphite is uncoated.

10. The thermoplastic or cross-linked polymer composition according to claim 1, wherein said thermoplastic or cross-linked polymer is cross linked.

11. The thermoplastic or cross-linked polymer composition according to claim 1, wherein said metal hypophosphite is aluminum hypophosphite or calcium hypophosphite.

12. The thermoplastic or cross-linked polymer composition according to claim 1, wherein said thermoplastic or cross-linked polymer is selected from the group consisting of ethylene vinyl acetate (EVA), ethylene butyl acetate (EBA), ethylene methyl acrylate (EMA), and their mixtures.

13. The thermoplastic or cross-linked polymer composition according to claim 1, wherein said metal hydroxide is aluminum hydroxide or magnesium hydroxide.

14. The thermoplastic or cross-linked polymer composition according to claim 1, wherein the thermoplastic or cross-linked polymer composition comprises additional ingredients selected from the group consisting of magnesium hydroxide, calcium carbonate, aluminum hypophosphite, coupling agents, and polydimethylsiloxane.

15. The thermoplastic or cross-linked polymer composition according to claim 1, wherein the metal hypophosphite is uncoated.

16. The thermoplastic or cross-linked polymer composition according to claim 1, wherein the metal hypophosphite has a chemical formula: $Me(H_2PO_2)_n$ in which n is an integer number ranging from 1 to 4.

17. The thermoplastic or cross-linked polymer composition according to claim 16, wherein the metal hypophosphite includes a metal of group I, II, III or IV of the periodic table of elements.

18. The thermoplastic or cross-linked polymer composition according to claim 1 used for tarpaulin, cable insulation or floor covering.

19. A thermoplastic polymer composition comprising a thermoplastic polymer, wherein said thermoplastic polymer is selected from the group consisting of polyolefins, polar polyolefins, and their mixtures and includes a combination of at least a metal hypophosphite and a metal hydroxide, the combination having a ratio of the metal hypophosphite to the metal hydroxide within the range of 1:100 to 1:3 by weight.

20. The thermoplastic polymer composition according to claim 19, wherein said thermoplastic polymer is a nonpolar polyolefin.

* * * * *